(12) United States Patent
Just et al.

(10) Patent No.: US 8,376,447 B2
(45) Date of Patent: Feb. 19, 2013

(54) ACTUATING DEVICE FOR A FOLDING TOP COMPARTMENT COVER

(75) Inventors: Jan Just, Bloomfield Hills, MI (US); Kwan Yoder, Waterford, MI (US); Waldemar Stapler, Stuttgart (DE)

(73) Assignee: Audi AG, Ingolstadt (DE)

( * ) Notice: Subject to any disclaimer, the term of this patent is extended or adjusted under 35 U.S.C. 154(b) by 556 days.

(21) Appl. No.: 12/693,872

(22) Filed: Jan. 26, 2010

(65) Prior Publication Data

US 2010/0186541 A1 Jul. 29, 2010

(30) Foreign Application Priority Data

Jan. 29, 2009 (DE) .......................... 10 2009 006 721

(51) Int. Cl.
*B60J 7/00* (2006.01)
(52) U.S. Cl. ................................ 296/107.08
(58) Field of Classification Search .............. 296/107.08, 296/107.01, 107.05, 107.07, 107.09, 107.12, 296/107.15, 108, 136.06
See application file for complete search history.

(56) References Cited

U.S. PATENT DOCUMENTS

| | | | | |
|---|---|---|---|---|
| 6,193,300 B1 * | 2/2001 | Nakatomi et al. | ....... | 296/107.08 |
| 6,352,298 B1 * | 3/2002 | Hayashi et al. | .......... | 296/107.08 |
| 6,619,720 B2 * | 9/2003 | Nicastri | .................... | 296/107.08 |
| 6,637,802 B2 * | 10/2003 | Obendiek | ..................... | 296/108 |
| 6,824,194 B2 * | 11/2004 | Weissmueller et al. | .. | 296/136.05 |
| 6,899,368 B2 * | 5/2005 | Neubrand | ....................... | 296/76 |
| 7,032,952 B2 * | 4/2006 | Dilluvio | .................... | 296/107.08 |
| 7,201,428 B2 * | 4/2007 | Wagner | .................... | 296/107.08 |
| 7,416,240 B2 * | 8/2008 | Eichholz et al. | ......... | 296/107.01 |
| 7,497,497 B2 * | 3/2009 | Vogt | .......................... | 296/107.08 |
| 7,735,899 B2 * | 6/2010 | Baumeier | ................ | 296/107.08 |
| 7,806,458 B2 | 10/2010 | Meinert | | |
| 8,042,856 B2 * | 10/2011 | Willard et al. | ........... | 296/107.01 |
| 2002/0011739 A1 | 1/2002 | Nicastri | | |
| 2002/0105205 A1 * | 8/2002 | Willard | ..................... | 296/107.07 |
| 2004/0051341 A1 * | 3/2004 | Willard | ..................... | 296/107.17 |
| 2004/0155480 A1 * | 8/2004 | Willard | ..................... | 296/107.08 |
| 2007/0108793 A1 * | 5/2007 | Schumacher et al. | ... | 296/107.08 |
| 2007/0170750 A1 * | 7/2007 | Just et al. | ....................... | 296/121 |
| 2008/0197666 A1 * | 8/2008 | Brockhoff | ................ | 296/107.08 |
| 2008/0203771 A1 | 8/2008 | Vogt | | |
| 2009/0015039 A1 * | 1/2009 | Meinert | .................... | 296/216.02 |
| 2009/0146464 A1 * | 6/2009 | Zehnder et al. | .......... | 296/216.01 |
| 2010/0066117 A1 * | 3/2010 | Schmitt | .................... | 296/107.08 |
| 2010/0109374 A1 * | 5/2010 | Just et al. | ...................... | 296/108 |
| 2010/0109375 A1 * | 5/2010 | Just et al. | ...................... | 296/122 |
| 2010/0253112 A1 * | 10/2010 | Willard et al. | ................ | 296/108 |
| 2010/0259066 A1 * | 10/2010 | Haberl et al. | ................ | 296/108 |
| 2012/0056443 A1 * | 3/2012 | Wilke et al. | .................... | 296/111 |

FOREIGN PATENT DOCUMENTS

| | | |
|---|---|---|
| DE | 19946454 A1 | 4/2000 |
| DE | 10160406 A1 | 6/2003 |
| DE | 102005006272 A1 | 8/2006 |
| DE | 60029213 T2 | 6/2007 |
| EP | 1964705 A2 | 9/2008 |
| WO | 2006084434 A1 | 8/2006 |

\* cited by examiner

*Primary Examiner* — Kiran B Patel
(74) *Attorney, Agent, or Firm* — Brooks Kushman P.C.

(57) ABSTRACT

An actuating device for opening and closing a cover of a folding top compartment of a convertible vehicle. The actuating device includes a drive unit and an interconnected seven-bar linkage system. The linkage system is pivotably connected to a main bearing of the vehicle body and is pivotably connected to the cover. The drive unit actuates the linkage system to move the linkage system between a retracted position corresponding to the cover being in a lowered closed position covering the folding top compartment and an extended position corresponding to the cover being in a raised opened position allowing access to the folding top compartment.

15 Claims, 3 Drawing Sheets

ACTUATING DEVICE FOR A FOLDING TOP COMPARTMENT COVER

CROSS-REFERENCE TO RELATED APPLICATIONS

This application claims foreign priority benefits under 35 U.S.C. §119(a)-(d) to DE 10 2009 006 721.3, filed Jan. 29, 2009, which is hereby incorporated by reference in its entirety.

BACKGROUND OF THE INVENTION

1. Field of the Invention

The present invention relates to an actuating device for opening and closing a cover of a folding top compartment of a convertible vehicle.

2. Background Art

DE 600 29 213 T2 (corresponds to U.S. Pat. No. 6,619,720) describes a convertible vehicle having an actuating device for opening and closing a cover of the trunk of the vehicle. The folding top of the vehicle is movable between a closed position and an opened position in which the top is stored in the trunk. The actuating device opens the cover from the trunk when the top is moving in or out of the trunk and closes the cover over the trunk when the top is stored in the trunk. The actuating device has two units arranged on respective longitudinal sides of the trunk. Each unit has levers and drive mechanisms which cooperate with main bearings situated on corresponding longitudinal sides of the vehicle body.

DE 101 60 406 A1 describes a convertible vehicle having a roof kinematic system for opening and closing a cover of a folding top compartment of the vehicle as the roof kinematic system moves the folding top of the vehicle between a closed position and an opened position in which the top is stored in the compartment. A lock cooperates with the roof kinematic system via a coupling element and fixes the cover in place when the cover is closed.

SUMMARY OF THE INVENTION

An object of the present invention is an actuating device for opening and closing a cover of a folding top compartment of a convertible vehicle in which the actuating device has a compartment linkage and drive units which cooperate with a main bearing with a defined low space requirement are characterized by simplicity and good functionality. A further aim is to ensure that in its raised operating position the folding top compartment cover occupies a favorable position for moving a folding top.

In carrying out the above object and other objects, the present invention provides an actuating device for opening and closing a cover of a folding top compartment of a convertible vehicle. The actuating device includes a drive unit and an interconnected seven-bar linkage system. The linkage system is pivotably connected to a main bearing of the vehicle body and is pivotably connected to the cover. The drive unit actuates the linkage system to move the linkage system between a retracted position corresponding to the cover being in a lowered closed position covering the folding top compartment and an extended position corresponding to the cover being in a raised opened position allowing access to the folding top compartment.

In an embodiment, the interconnected seven-bar linkage system includes a folding top compartment linkage, an actuating lever, a first coupling lever, a support lever, a first control lever, a second control lever, and a second coupling lever. The folding top compartment linkage is pivotably connectable to a main bearing of a vehicle body and the support lever is mountable to a cover of a folding top compartment. The first control lever is pivotally connected to the support lever and the second control lever is pivotally connected to the support lever. The drive unit actuates the linkage system to move the linkage system between a retracted position corresponding to the cover being in a lowered closed position and an extended position corresponding to the cover being in a raised opened position. In order to actuate the linkage system, the drive unit acts on the actuating lever which via the first coupling lever drives the first control lever which is pivotably connected to the support lever and thereby drives the second control lever which is pivotably connected to the support lever and which cooperates with the folding top compartment linkage via the second coupling lever.

In embodiments of the present invention, the cooperation of the drive unit with the actuating lever, the first coupling lever, the support lever mounted on the compartment cover, the first control lever, the second control lever supported on the support lever, and the second coupling lever, and the connecting lever provide favorable conditions for the design of the levers. This lever design achieves an exemplary function for the motion of the folding top compartment cover, namely, into the operating position, and its levers properly transmit the forces occurring between the lever and the main bearing during opening and closing motions of the folding top. The main bearing together with the bearings for at least a portion of the levers is well suited for implementing a compact design, i.e., having low space requirements.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
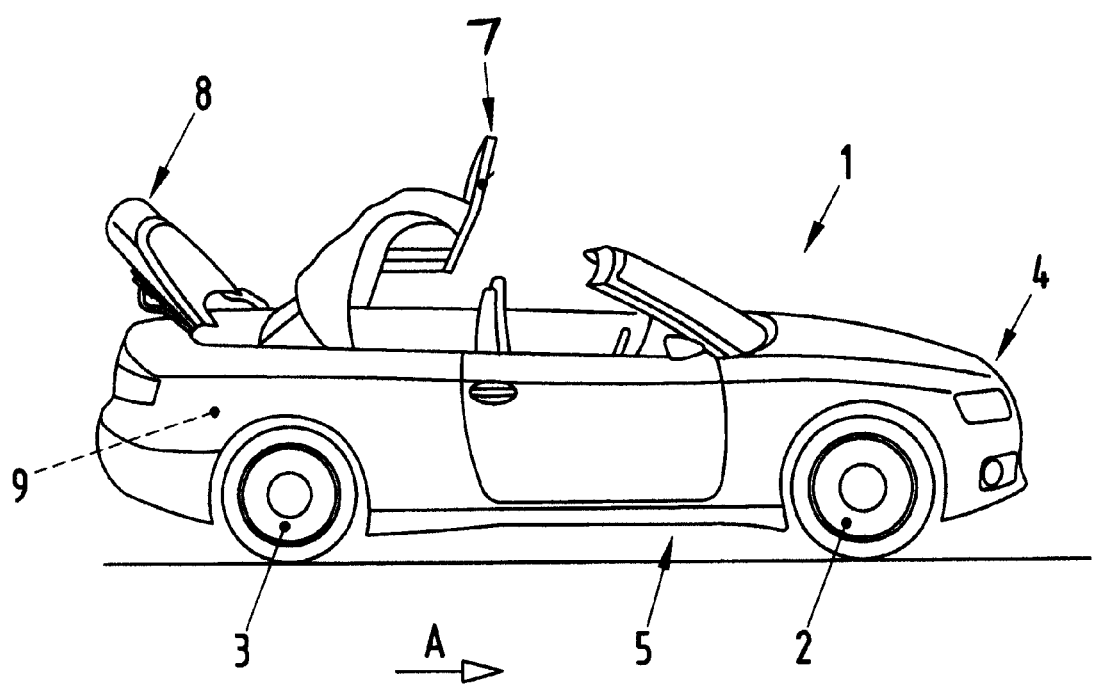
FIG. 1 illustrates a passenger vehicle having a folding top, a folding top compartment with an associated cover, and an actuating device for moving the cover between a lowered closed position covering the compartment and a raised opened position uncovering the compartment in accordance with an embodiment of the present invention.

Referring now to FIG. 1, a passenger vehicle 1 in accordance with an embodiment of the present invention is shown. Vehicle 1 includes a vehicle body 4 having a base body 5 and supported by two sets of wheels 2 and 3.

Vehicle body 4 includes a folding top compartment 9 (e.g., a trunk) having an associated folding top compartment cover 8. Cover 8 is pivotably supported on vehicle body 4 to move between a lowered closed position Rst (see FIG. 2) and a raised opened position Bst (see FIG. 3). In the lowered closed position, cover 8 covers (i.e., closes) folding top compartment 9 with respect to vehicle top side Fos (see FIG. 2). As a result, cover 8 prevents access to and from folding top compartment 9 via vehicle top side Fos. In the raised opened position, cover 8 uncovers (i.e., opens) folding top compartment 9. As a result, cover 8 enables access to and from folding top compartment 9 via vehicle top side Fos.

Vehicle 1 further includes a folding top 7 having an associated roof kinematic system. Folding top 7 is movably connected to vehicle body 4 by the roof kinematic system to move between a closed position and an opened position. In its closed position, folding top 7 extends over and covers a passenger area of vehicle 1. In its opened position, folding top 7 is lowered into and stored in folding top compartment 9.

In order to move folding top 7 between its closed and opened positions, cover 8 has to be in the raised opened position. That is, cover 8 has to be in the raised opened position when folding top 7 is being moved from its closed position to its opened position. Likewise, cover 8 has to be in the raised opened position when folding top 7 is being moved from its opened position to its closed position. As such, when cover 8 is in the lowered closed position and folding top 7 is to be moved into or out of folding top compartment 9, cover 8 has to be moved to the raised opened position. During typical operation, cover 8 is in the lowered closed position when folding top 7 is set in either of its closed or opened positions. When folding top 7 is in its opened position stored within folding top compartment 9 and cover 8 is in the lowered closed position, cover 8 covers folding top compartment 9 and folding top 7 stored therein.

Figure 2:
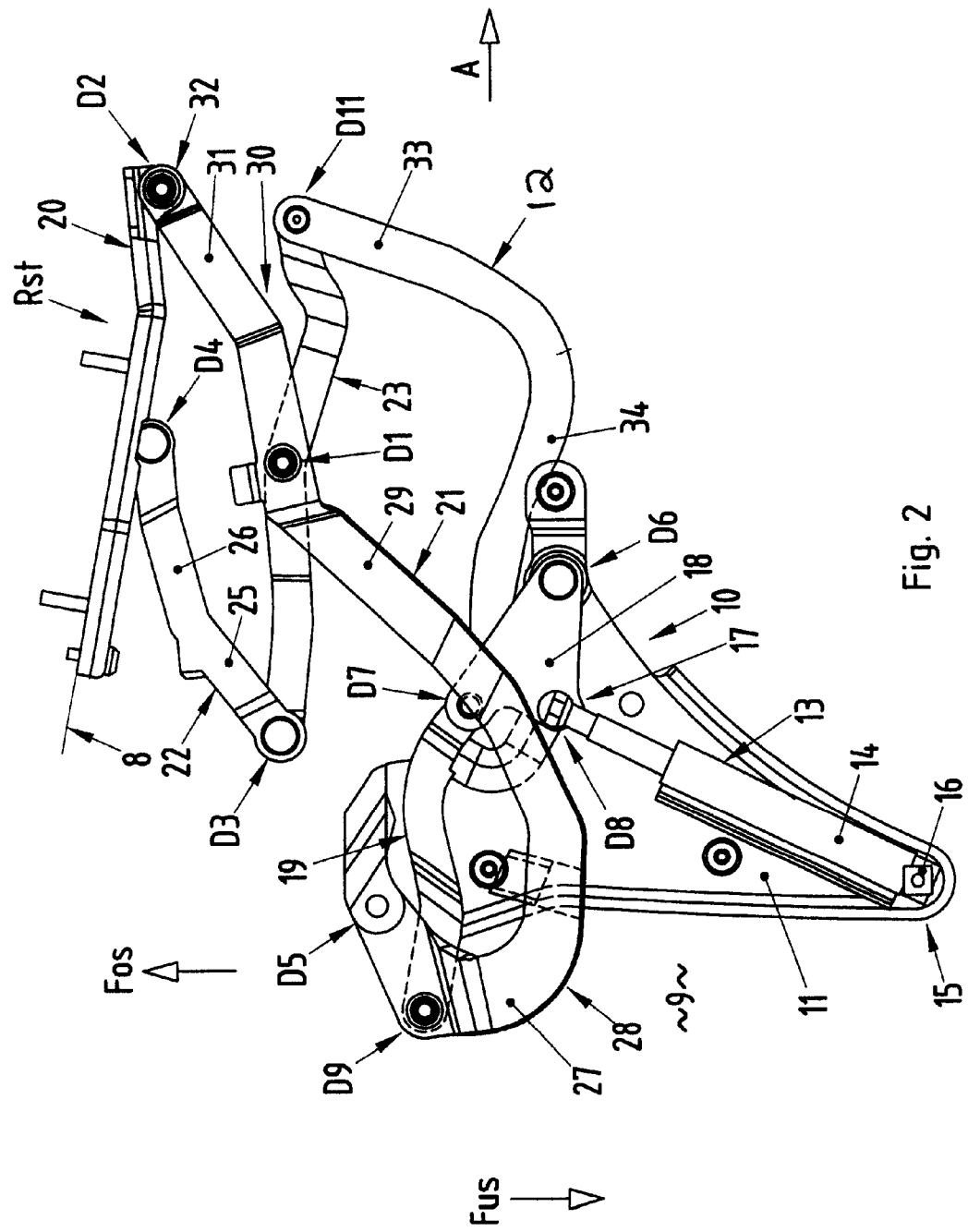
FIG. 2 illustrates one unit of the actuating device in a retracted position corresponding to the cover being in the lowered covered position covering the folding top compartment.
Figure 3:
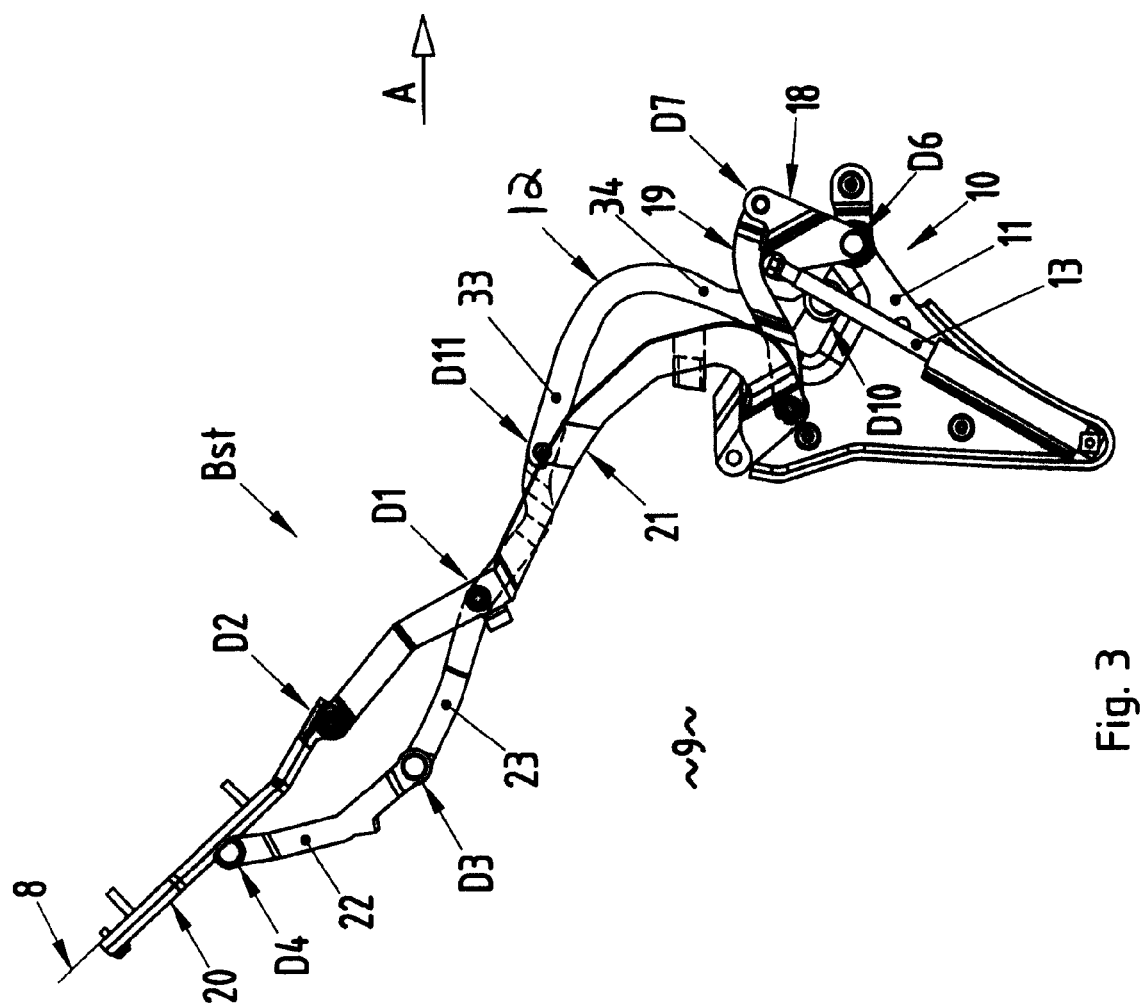
FIG. 3 illustrates one unit of the actuating device in an extended position corresponding to the cover being in the raised opened position uncovering the folding top compartment.

Vehicle 1 further includes an actuating device 10 (shown in FIGS. 2 and 3). Actuating device 10 is operable for moving cover 8 between the lowered closed position and the raised opened position. Actuating device 10 becomes active to move cover 8 as a function of the motion of folding top 7 between the closed and opened positions. That is, actuating device 10 becomes active to move cover 8 when folding top 7 is being moved between its closed and opened positions.

Actuating device 10 includes two units arranged on respective longitudinal sides of folding top compartment 9. Each unit of actuating device 10 includes the same components which cooperate with respective main bearings situated on corresponding longitudinal sides of vehicle body 4 as explained in greater detail below.

Referring now to FIGS. 2 and 3, with continual reference to FIG. 1, one unit of actuating device 10 is shown. As each unit of actuating device 10 includes the same components and same configuration only the unit of actuating device 10 shown in FIGS. 2 and 3 will be described. In FIG. 2, the unit of actuating device 10 is in a retracted position corresponding to the lowered closed position of cover 8 covering folding top compartment 9. In FIG. 3, the unit of actuating device 10 is in an extended position corresponding to the raised opened position of cover 8 uncovering folding top compartment 9.

The unit of actuating device 10 includes seven linkages: a folding top compartment linkage 12, an actuating lever 18, a first coupling lever 19, a support lever 20, a first control lever 21, a second control lever 22, and a second coupling lever 23. These seven linkages form a seven-bar linkage system. The unit of actuating device further includes a drive unit 13.

Folding top compartment linkage 12 is mounted on a main bearing 11 on a corresponding longitudinal side of vehicle body 4. This longitudinal side of vehicle body 4 corresponds to the longitudinal side of folding top compartment 9 on which the unit of actuating device 10 is arranged.

Drive unit 13 is supported on main bearing 11. Drive unit 13 is an actuating cylinder 14 or a generic hydraulic unit. Actuating cylinder 14 has a first end region 15, a cylinder bearing 16, and a second end region 17. First end region 15 is articulately connected to main bearing 11. Second end region 17 acts on actuating lever 18.

Actuating lever 18, via first coupling lever 19, drives first control lever 21. First control lever 21 is connected to support lever 20. Support lever 20 is mounted on the underside of cover 8.

Folding top compartment linkage 12 is articulately connected to main bearing 11. Second control lever 22 cooperates with folding top compartment linkage 12 via a second coupling lever 23 and is articulately supported on support lever 20.

First control lever 21 and second coupling lever 23 are connected to one another in a mutual first rotational axis D1. First control lever 21 and support lever 20 are connected to one another in a mutual second rotational axis D2. Second control lever 22 and second coupling lever 23 are connected to one another in a mutual third rotational axis D3. First rotational axis D1 is situated between second rotational axis D2 and third rotational axis D3.

Second control lever 22 is supported on support lever 20 by a fourth rotational axis D4. Second control lever 22 includes a first lever section 25 and a second lever section 26. Lever sections 25, 26 extend at an obtuse angle relative to one another.

First control lever 21 is articulately connected to main bearing 11 with interconnection of a fifth rotational axis D5. As viewed in the direction of forward vehicle travel A (see FIG. 1), fifth rotational axis D5 is situated behind second rotational axis D2 between support lever 20 and first control lever 21.

First control lever 21 includes a first lever section 27, a second lever section 29, and a third lever section 31. First lever section 27 leads away from fifth rotational axis D5, extends in the direction of the underside of the vehicle Fus, and has a curvature 28 of approximately 180°. Second lever section 29 is connected thereto and leads up to first rotational axis D1. Third lever section 31 is connected thereto, has a right-angle bend 30, and leads to second rotational axis D2 with an end 32 of third lever section 31 terminating at second rotational axis D2.

Actuating lever 18 is articulately connected to a sixth rotational axis D6 on main bearing 11 and to a seventh rotational axis D7 on first coupling lever 19. Actuating lever 18 and actuating cylinder 14 are pivotably coupled on an eighth rotational axis D8. First coupling lever 19 is articulately connected to a ninth rotational axis D9 on first control lever 21. Ninth rotational axis D9 is in the region of curvature 28 of first lever section 27 of first control lever 21.

Viewed in the direction of forward vehicle travel A and, for example, in the lowered closed position of cover 8, folding top compartment linkage 12 is located between main bearing 11 and second coupling lever 23 on a tenth rotational axis D10 situated on main bearing 11 (FIG. 3). Folding top compartment linkage 12 includes connecting lever sections 33 and 34 which extend about at right angles relative to one another. Second coupling lever 23 and folding top compartment linkage 12 cooperate via an eleventh rotational axis D11.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An actuating device for opening and closing a cover of a folding top compartment of a convertible vehicle, the actuating device comprising:
   a drive unit;
   a folding top compartment linkage, an actuating lever, a first coupling lever, a support lever, a first control lever, a second control lever, and a second coupling lever which are interconnected to form a seven-bar linkage system;
   wherein the folding top compartment linkage is pivotably connectable to a main bearing of a vehicle body and the support lever is mountable to the cover of the folding top compartment;
   wherein the first control lever is pivotally connected to the support lever and the second control lever is pivotally connected to the support lever;
   wherein the drive unit actuates the linkage system to move the linkage system between a retracted position corresponding to the cover being in a lowered closed position and an extended position corresponding to the cover being in a raised opened position;
   wherein in order to actuate the linkage system, the drive unit acts on the actuating lever which via the first coupling lever drives the first control lever which is pivotably connected to the support lever and thereby drives the second control lever which is pivotably connected to the support lever and which cooperates with the folding top compartment linkage via the second coupling lever.

2. The actuating device of claim 1 wherein:
   the first control lever and the second coupling lever are pivotably connected together at a first rotational axis.

3. The actuating device of claim 2 wherein:
   the first control lever and the support lever are pivotably connected together at a second rotational axis.

4. The actuating device of claim 3 wherein:
   the second control lever and the second coupling lever are pivotably connected together at a third rotational axis.

5. The actuating device of claim 4 wherein:
   the first rotational axis is between the second rotational axis and the third rotational axis.

6. The actuating device of claim 4 wherein:
   the second control lever and the support lever are pivotably connected together at a fourth rotational axis.

7. The actuating device of claim 6 wherein:
   the first control lever is pivotably connected to the main bearing at a fifth rotational axis.

8. The actuating device of claim 7 wherein:
   the first control lever includes a first lever section, a second lever section, and a third lever section, wherein the first lever section extends from the fifth rotational axis and has a curvature of approximately 180°, the second lever section extends between the curvature of the first lever section and the first rotational axis, and the third lever section has a right-angle bend and extends from the first rotational axis to the second rotational axis.

9. The actuating device of claim 7 wherein:
   the actuating lever is pivotably connected to the main bearing at a sixth rotational axis.

10. The actuating device of claim 9 wherein:
    the actuating lever and the first coupling lever are pivotably connected together at a seventh rotational axis.

11. The actuating device of claim 10 wherein:
    the actuating lever and the drive unit are pivotably connected together at an eighth rotational axis.

12. The actuating device of claim 11 wherein:
    the first coupling lever and the first control lever are pivotably connected together at a ninth rotational axis.

13. The actuating device of claim 12 wherein:
    the folding top compartment linkage includes first and second linkage sections;
    wherein the second linkage section is pivotably connectable to the main bearing at a tenth rotational axis;
    wherein the first linkage section and the second coupling lever are pivotably connected together at an eleventh rotational axis.

14. The actuating device of claim 13 wherein:
    the first and second linkage sections of the folding top compartment linkage extend at an acute angle from one another.

15. The actuating device of claim 13 wherein:
    the first and second linkage sections of the folding top compartment linkage extend at about a right angle from one another.

* * * * *